United States Patent [19]

Skala

[11] 4,367,698

[45] * Jan. 11, 1983

[54] INTERNAL COMBUSTION ENGINE BASED ON REACTANT CONTACT IGNITION

[76] Inventor: Stephen F. Skala, 3839 S. Wenonah Ave., Berwyn, Ill. 60402

[*] Notice: The portion of the term of this patent subsequent to Oct. 7, 1992, has been disclaimed.

[21] Appl. No.: 181,080

[22] Filed: Aug. 25, 1980

Related U.S. Application Data

[63] Continuation-in-part of Ser. No. 301,285, Oct. 27, 1972, abandoned, and a continuation-in-part of Ser. No. 457,207, Apr. 2, 1974, Pat. No. 3,911,284, and a continuation-in-part of Ser. No. 464,454, Apr. 26, 1974, abandoned, and a continuation-in-part of Ser. No. 578,527, May 19, 1975, Pat. No. 4,020,798, and a continuation-in-part of Ser. No. 781,747, Mar. 28, 1977, abandoned, and a continuation of Ser. No. 950,845, Oct. 12, 1978, abandoned.

[51] Int. Cl.$^3$ .............................................. F02B 75/12
[52] U.S. Cl. .................. 123/1 A; 123/25 E; 123/DIG. 12
[58] Field of Search ............ 123/1 A, 25 E, DIG. 12, 123/3

[56] References Cited

U.S. PATENT DOCUMENTS

| | | | |
|---|---|---|---|
| 2,218,522 | 10/1940 | Butler | 123/25 C |
| 3,664,134 | 5/1972 | Seitz | 123/1 A |
| 3,696,795 | 10/1972 | Smith et al. | 123/1 A |
| 3,818,875 | 6/1974 | Phillips et al. | 123/25 E |
| 3,911,284 | 10/1975 | Skala | 290/1 R |
| 4,020,798 | 5/1977 | Skala | 123/1 A |

Primary Examiner—Charles J. Myhre
Assistant Examiner—E. Rollins Cross
Attorney, Agent, or Firm—Stephen F. Skala

[57] ABSTRACT

Reactants having negligible activation energy react spontaneously and instantly upon contact to release heat. Such reactants are injected as colliding jets into a working fluid compressed in a combustion chamber of an internal combustion engine. The released heat causes the working fluid to expand against a movable member of the engine whereby mechanical energy is developed.

Preferred reactants having negligible activation energy are an alkali metal with water and a preferred working fluid is air. The combustion chamber reaction occurs in two distinct steps: In the first step, the alkali metal and water react with negligible activation energy to evolve hydrogen. In the second step, the evolved hydrogen and working fluid oxygen react with substantial activation energy. Undesirable effects of the activation energy are reduced by the substantial portion of heat release occurring in the first step and by improved ignition of the hydrogen as it evolves. Such reduced effects of activation energy allow improved engine design and operation to include optimal compression, simple and efficient open chamber engine structures, and assured self starting upon injection of said reactants into an engine stopped in an expansion phase.

12 Claims, 3 Drawing Figures

INTERNAL COMBUSTION ENGINE BASED ON REACTANT CONTACT IGNITION

CROSS-REFERENCE TO RELATED APPLICATIONS

Ser. No. 174,247 entitled Self Starting of Internal Combustion Engines Based on Reactant Contact Ignition.

BACKGROUND

This application is a continuation-in-part of Ser. No. 301,285 filed Oct. 27, 1972 and now abandoned; and is a continuation-in-part of Ser. No. 457,207 filed Apr. 2, 1974 and now U.S. Pat. No. 3,911,284; and is a continuation-in-part of Ser. No. 464,454 filed Apr. 26, 1974 and now abandoned; and is a continuation-in-part of Ser. No. 578,527 filed May 19, 1975 and now U.S. Pat. No. 4,020,798; and is a continuation-in-part of Ser. No. 781,747 filed Mar. 28, 1977 and now abandoned; and is now a continuation of Ser. No. 950,845 filed Oct. 12, 1978 and now abandoned.

This invention relates to internal combustion engines fueled by reactants having negligible activation energy and particularly to such engines having said reactants injected in a contacting relationship into a combustion chamber of the engine.

The cited parent application Ser. No. 301,285 filed Oct. 27, 1972 and U.S. Pat. No. 3,911,284 disclose a free piston internal combustion engine into which a liquid alkali metal and water are injected to contact immediately whereby heat released spontaneously upon contact of the reactants causes evolved hydrogen or other working fluids to expand against the pistons and develop energy for a load. As will be described herein, studies made before these engine disclosures had shown that colliding jets of liquid alkali metal and water substantially completed their reaction within a two millisecond time of injection into a constant volume reactor. Injectors of the type used in these studies were applicable to the practice of the invention.

An internal combustion engine based on alkali metal and water as fuels was disclosed by E. H. Phillips et. al. in U.S. Pat. No. 3,818,875 wherein an air and water mixture were compressed for injection of the liquid alkali metal. The reaction of alkali metal droplets with water as vapor or droplets, however, is slow due to mixing time. A slow reaction is undesirable both for starting an engine and for normal operation since rapid heat addition at substantially maximum compression contributes to thermodynamic efficiency.

The fast reactions were studied and reported by M. Kilpatrick et al. in "The Journal of Physical Chemistry", Vol. 59, 385 (1953) wherein liquid alkali metal and water were injected as colliding jets into a reactor of constant volume. When air is present, the reactions occur in two distinct steps. The first step represented by

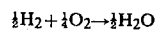

occurred spontaneously and was completed during the two millisecond injection interval which is characteristic of reactants having negligible activation energy. Other reactants which also react instantly and spontaneously upon contact with negligible activation energy include triethyldialane, $(C_2H_5)_3Al_2H_3$, with water to evolve hydrogen and sodium with bromine which does not evolve a gas.

The second step of the reaction of sodium with water in the presence of air

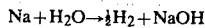

was delayed to occur as a second pressure transient which is characteristic of reactions involving substantial activation energy. Reactants generally are either in a class having negligible activation energy or in a class having substantial activation energy. Prior to the present invention, all fuels for internal combustion engines were in the class having substantial activation energy. These two classes of reactants can be identified by their reaction characteristics independently of their use in internal combustion engines. Reactants such as sodium and water in the class having negligible activation energy react instantly upon contact and in the apparatus of Kilpatrick et al are not observed to have any delay before so reacting. Reactants in the class having substantial activation energy, under normal conditions, can be mixed and tend not to react until ignited by a spark or high temperature. Even when they are ignited, there is a measurable delay period which can be observed in the apparatus of Kilpatrick et al. Activation energy corresponds to an energy barrier representing intermediate reaction complexes between a higher initial and a lower final energy state. Fuels for prior internal combustion engines such as liquid and gaseous hydrocarbons, hydrogen, alcohols, ammonia, and hydrazine reacting with oxygen all form metastable mixtures which require ignition to overcome activation energy barriers. The fuel-oxidant reaction process includes mixing the fuel vapor and oxidant, initiating the reaction by such means as a spark or a high temperature, an induction period during which intermediate active species such as peroxides and aldehydes which promote subsequent reactions but release negligible heat themselves accumulate to a critical concentration, and an ignition phase characterized by a rapid chain reaction with an accelerating increase of temperature and pressure to complete the reaction.

The activation energy and consequent reaction process of conventional fuels constrains design of spark ignited Otto engines and compression temperature ignited Diesel engines. The Otto engine is enabled by the metastability of an explosive working fluid but other effects are undesirable. Detonation, which can occur during steady engine operation and is damaging and inefficient, is reduced by limiting compression below thermodynamically efficient limits, by use of more expensive high octane fuels, and by more complex ignition of rich mixtures in separate chambers. Operable fuel-air mixtures are maintained by throttling with consequent pumping loss. Starting at ambient engine temperatures requires inefficiently rich fuel-air mixtures to reduce ignition delay and requires cranking at least through a complete cycle to include intake and compression. Low temperature starting is difficult even with more volatile fuels and extended cranking. Large Diesel engines with open chambers operate efficiently at optimal compressions in the range of 11:1 to 18:1 with moderate surface heat loss but are subject to undesirable effects of activation energy which include detonation with consequent audible engine knock, engine stresses, and rough operation. Automative Diesel engines having prechambers for initial partial combustion reduce detonation but the ignition and mixing process extends combustion to reduce thermodynamic efficiency and high compressions of over 20:1 required for ignition result in large heat loss through combustion chamber surfaces. Starting at ambient temperatures requires full compression to attain ignition temperatures with auxiliary glow plugs and occasional use of volatile fuel additives.

None of the prior internal combustion engines based on fuel and oxidant reactions having substantial activation energy have the desirable combination of simple open chamber structure, optimal compression with substantially constant volume heat addition for thermodynamic efficiency, absence of detonation, and simple and reliable cold engine starting.

OBJECTS

It is a general object to provide an improved type of internal combustion engine.

It is another object to provide an internal combustion engine which substantially reduces effects of ignition failure or delay.

It is yet another object to provide an internal combustion engine wherein heat release occurs rapidly at substantially maximum compression of a working fluid.

SUMMARY

These and other objects and advantages which will become apparent are attained in accordance with the invention wherein reactants having negligible activation energy are injected simultaneously and in a contacting relationship into a combustion chamber of an internal combustion engine which contains a working fluid at substantially maximum compression. Heat released spontaneously and instantly upon contact of the reactants increases temperature and pressure of the compressed working fluid which undergoes restrained expansion against a movable member communicating with the combustion chamber to develop energy for operating a load coupled to the movable member. A representative period of heat release is two milliseconds when reactants are injected as colliding jets according to the cited reference of Kilpatrick et al.

The present invention invention includes the inventions disclosed in my U.S. Pat. Nos. 3,911,284 and 4,020,798 within an extended group of fuel substances having the property of negligible activation energy of which the previously described alkali metal with water are preferred. The absence of activation energy of injected reactants distinguishes the present engine from conventional Otto and Diesel engines which are based on fuels having substantial activation energy to result in such effects as ignition delay or failure and detonation. The instant and assurred reaction upon injection of the present reactants allows optimum compression since excessive compression is not required to assure ignition and inadequate compression is not required to avoid detonation, allows open chamber and other simple and economical engine structures since critical mixtures for ignition and reduction of detonation are not required, and allows improved self starting as is disclosed in the cited copending application Ser. No. 174,247 wherein injection of the reactants into an engine stopped in an expansion phase provides power for starting.

Although a compressed working fluid is not required for operation of the present engine since evolved hot gases can provide restrained expansion to develop mechanical energy, a thermodynamic cycle based on heat addition by rapid injection of the reactants into a working fluid at substantially maximum compression is preferred. In particular, air is the preferred working fluid for alkali metal with water which evolve hydrogen for further reaction with atmospheric oxygen. The hydrogen-oxygen reaction, however, occurs with substantial activation energy but its effects are reduced since only half of the reaction energy is due to the hydrogen-oxygen reaction and the hydrogen is ignited under favorable conditions which include a high compression temperature increased by the alkali metal-water reaction and a heterogeneous rich mixture is formed around the reacting alkali metal and water functioning as a pilot fuel.

The invention wherein reactants having negligible activation energy are injected in a contacting relationship into a combustion chamber of an internal combustion engine to produce heat for restrained expansion of a working fluid against a movable member is embodied in the following representative engine types.

A free piston engine compresses residual hydrogen from a previous cycle for injection of alkali metal and water. The heat of reaction and evolved hydrogen force the pistons apart to develop mechanical energy which is coupled to a load. As the pistons approach maximum separation, most of the alkali hydroxide and hydrogen reaction by-products are released through openings in the cylinder for subsequent processing. Air entrapped in end portions of the cylinder forces the pistons inward and compresses the residual hydrogen as a working fluid for another injection of alkali metal and water.

A two stroke cycle internal combustion engine receives a charge of working fluid at the end of an expansion phase. At substantially maximum compression of the working fluid, the reactants having negligible activation energy are injected for spontaneous and instant heat release upon contact.

A four stroke internal combustion engine has a cycle comprising intake and compression of the working fluid, injection of the reactants having negligible activation energy at substantially maximum compression of the working fluid, restrained expansion, and exhaust of the working fluid containing reaction by-products.

DESCRIPTION OF THE DRAWINGS

Figure 1:
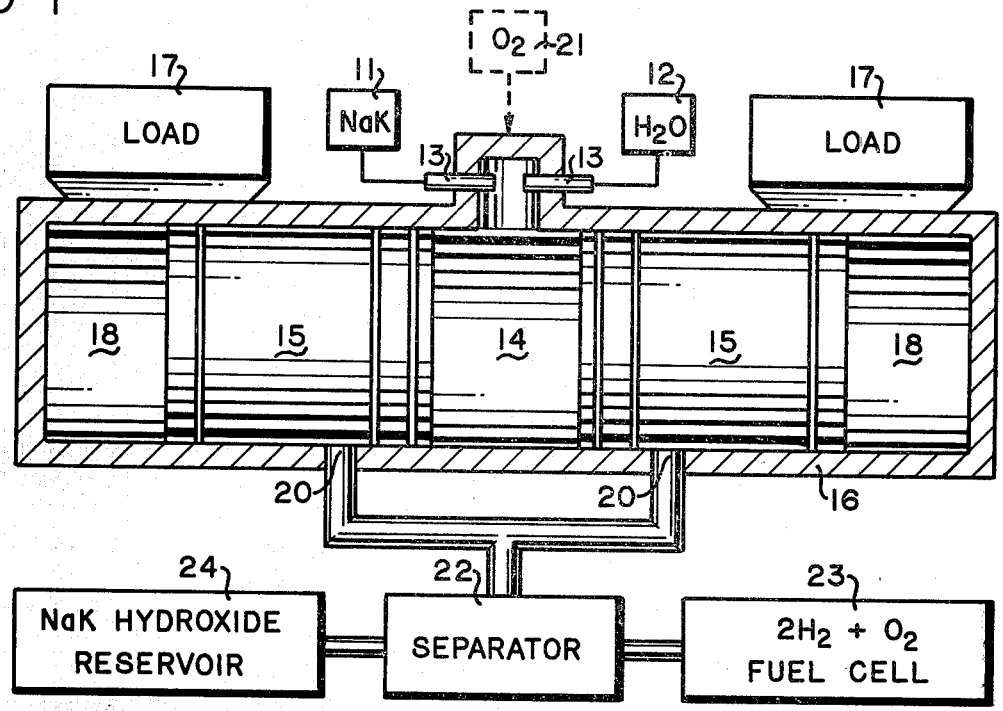
FIG. 1 is a diagrammatic view mostly in section showing basic features of the invention embodied in a free piston engine which started and operated by injecting NaK and water as representative reactants according to the invention.

FIG. 1 shows a free piston internal combustion engine using a reaction of NaK and water to form hot hydrogen which expands against a load to generate mechanical power which is converted to electrical power by the load. Hydrogen exhausted from the engine is transferred to a hydrogen-oxygen fuel cell for conversion to electrical power. The NaK is part of a fuel system cycle and the internal combustion engine is part of a hybrid vehicle having an electric motor drive, battery electrical storage, and electrical generators comprising the internal combustion motor-generator and the fuel cell as was described in the cited parent application and U.S. Pat. No. 3,911,284.

NaK from NaK reservoir 11 and water from water reservoir 12 are injected by reactant injections 13 into combustion chamber 14 between a pair of reciprocating pistons 15. Hydrogen gas, formed and heated by the NaK and water reaction, forces the pistons toward opposite ends of cylinder 16. The outward motion of the pistons is restrained by a load 17 and by work of compressing air in end portions 18 of the cylinder. The load is a variable reluctance electrical generator coupled magnetically to the pistons. As the pistons approach their maximum end position, a sliding valve consisting of the piston and port 20 opens to exhaust the combustion chamber and to allow the force of air entrapped in the end portions of the cylinder to drive the pistons inward. As the pistons move inwardly to compress the hydrogen in the combustion chamber, the driving force of the air entrapped in the end portions of the cylinder decreases to become a restraining force while energy is transferred to the load. The energy transferred to the load is restored to the pistons by succeeding injections of NaK and water into the combustion chamber 14 to sustain oscillatory movement of the pistons. As an alternative practice, oygen could be introduced into the combustion chamber 14 from compressed oxygen source 21 so that the hydrogen formed during the reaction of NaK with water would undergo combustion. Exhaust products comprising the hydrogen gas and particulates of NaK hydroxide passing through the exhaust port 20 enter separator 22 where the particulates are separated from the gas as is described in more detail in the cited copending application. The hydrogen is directed to fuel cell 23 for reaction with oxygen to generate electrical power and the NaK hydroxide is deposited in NaK hydroxide reservoir 24 for retention and removal during a fuel stop.

Although free piston engines have been operated as spark ignited and compression temperature ignited engines, it has been difficult to attain adequate compression and temperature for starting. The reactant contact ignited engine of the present invention, however, is easily started even under cold engine conditions. Representative initial conditions are ambient temperature and pressure in the combustion chamber 14 and end portions 18 of the cylinder. An initial injection of NaK and water generates hot hydrogen which expands to begin oscillatory motion of the pistons which increases with succeeding injections of NaK and water to normal amplitude.

Figure 2:
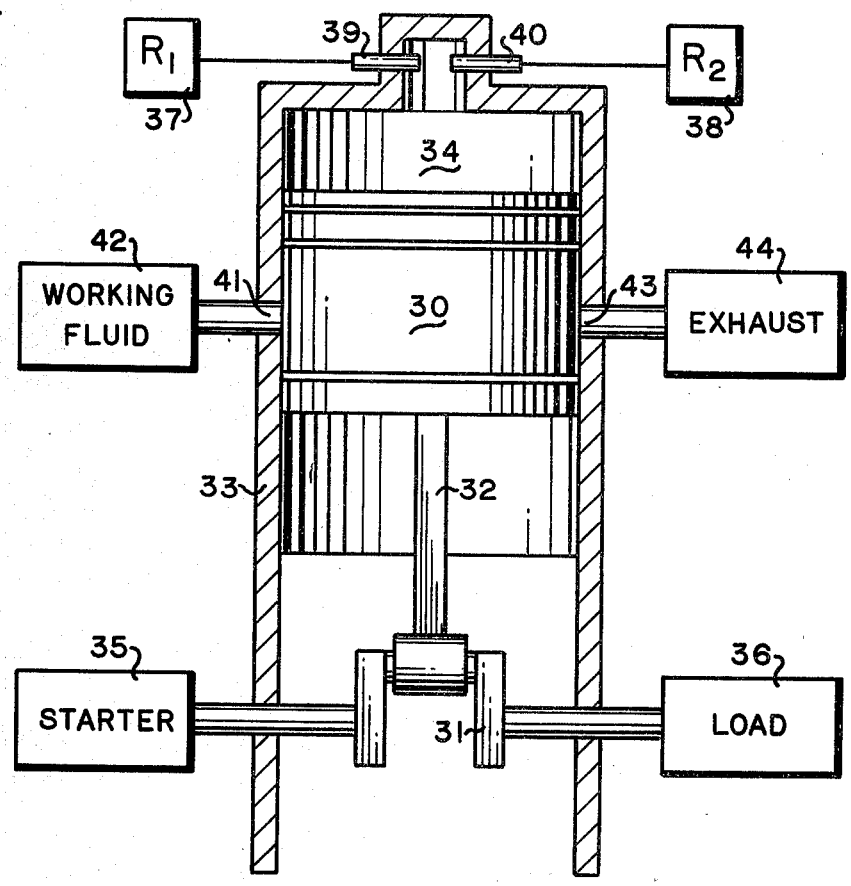
FIG. 2 is a diagrammatic view mostly in section of an internal combustion engine using injected reactants having negligible activation energy of reaction for starting and operating with a motor starter to provide a portion of starting power.

FIG. 2 shows an internal combustion engine which illustrates advantages of reactants, such as NaK with water, which are characterized as having negligible activation energy of reaction and manifested as spontaneous and instant reaction upon contact occuring under all engine conditions. These reactant ignition characteristics are a basis for an improved engine starting process comprising an initial positioning of the engine only into a beginning of an expansion phase at which step injection of the reactants with their assured reaction provides all additional power to bring the engine to normal operating conditions with optimal compression and enhanced ignition of other reactants, such as hydrogen with oxygen, which may be present in the engine's working fluid. The internal combustion engine shown is of a two stroke cycle type.

A piston 30 connected to crank 31 through connecting rod 32 reciprocates within cylinder 33. A combustion chamber 34 includes upper portions of the cylinder and the piston. The crank connects to a starter 35, such as an electric motor, and the crank also connects to load 36 which may be drive wheels of a vehicle connected through a transmission, not shown. When the piston is substantially at its maximum upward position, a first reactant from a reservoir 37 (designated $R_1$) and a second reactant from a reservoir 38 (designated $R_2$) are injected through injectors 39 and 40 respectively. The first and second reactants are of the kind characterized as reacting with negligible activation energy. The injectors 39 and 40 may be operated by mechanical pumping means connected by synchronizing gears to the crank 31, as is known for fuel injectors in Diesel engines. The reactants preferably are injected as intersecting jets and may be structured as described in the cited paper by Kilpatrick et al. Heat and any gases which result from the reaction of the first and second reactants exert pressure on the piston and drive it downward to develop power from restrained expansion of the working fluid. As the piston 30 approaches its maximum downward position, it passes intake port 41 connected to a source of working fluid 42 under pressure and it also passes exhaust port 43. Exhaust 44, comprising the working fluid and products of reaction, may be processed to release only heat and harmless gases and vapors to the atmosphere. A fresh charge of working fluid is compressed as the crank drives the piston upward for injection of the first and second reactants at substantially maximum compression.

When the first and second reactants evolve gases upon contact, self-starting of the engine can be improved. In one embodiment, starting requires cranking just sufficient to actuate the injectors 39 and 40. Typical initial starting conditions include ambient cylinder pressure and temperature with the engine in any of its phases. During starting, the starter 35 turns the crank 31 to begin an expansion phase with injection of the first and second reactants into the combustion chamber 34 which results in evolution of a hot gas driving the piston downward to provide all remaining power to complete the starting process. The remaining steps for starting are those of normal operation with the piston 30 passing the intake and exhaust ports 41 and 43 with sufficient amplitude to provide maximum compression from kinetic energy of the crank 31. In particular, starting occurs even when the piston 30 is positioned initially just before injection of the first and second reactants occurs so that upon incremental cranking by the starter, ignition occurs at substantially ambient pressure and temperature. The starter 35 is disengaged from the crank as the expansion phase is entered.

Figure 3:
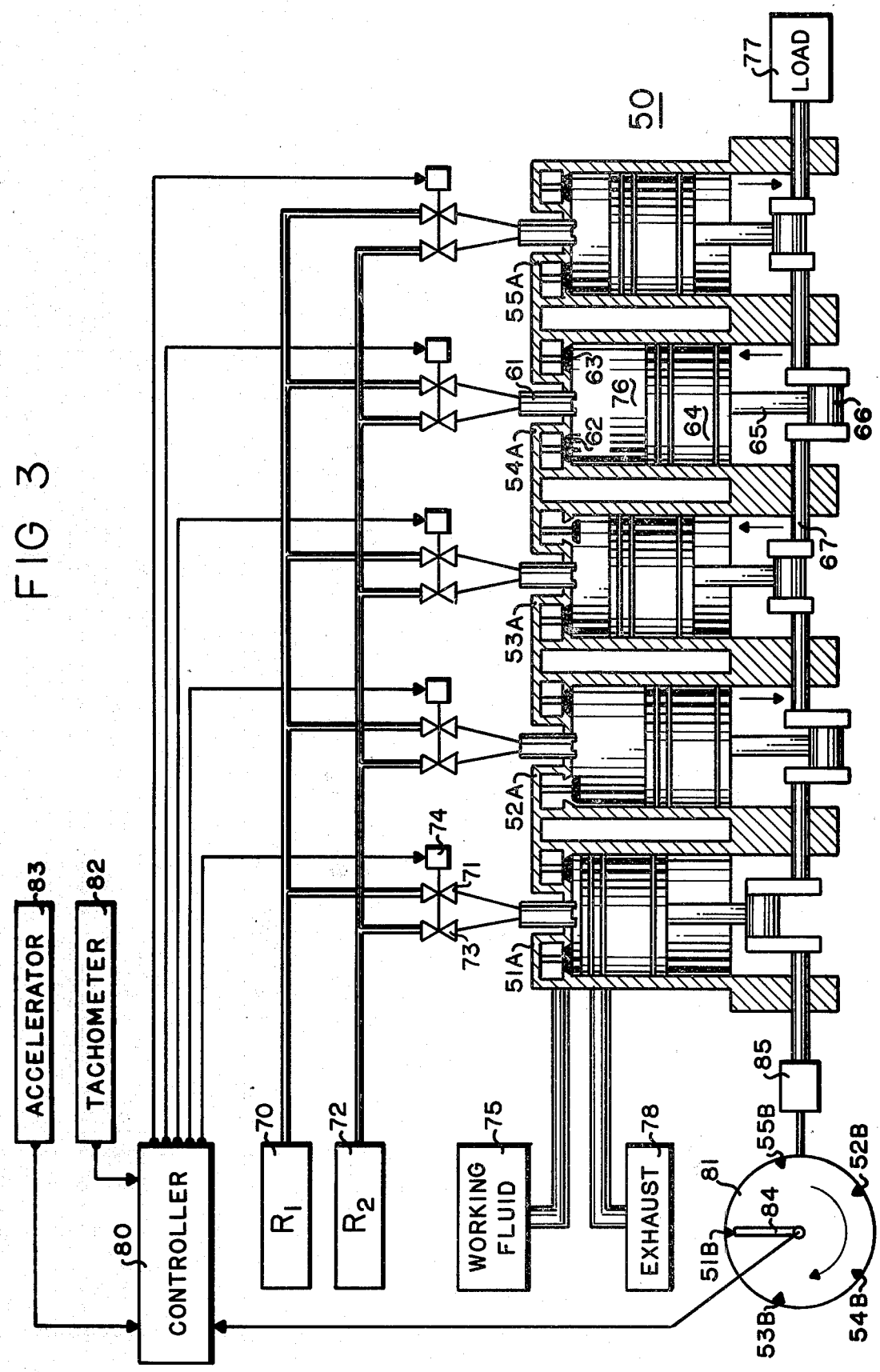
FIG. 3 is a diagrammatic view mostly in section of an internal combustion engine having a plurality of cylinders which is started by injecting the reactants into a cylinder which has started an expansion phase.

FIG. 3 illustrates an alternative process for starting and operating an internal combustion engine which derives power from the spontaneous and instant reaction of reactants which evolve gases such as the preferred reaction of NaK with water to evolve hydrogen. In an internal combustion engine having a sufficient plurality of cylinders to assure that at least one of the cylinders is in an expansion phase, the reactants are injected into the cylinder in an expansion phase to evolve hot gases which expand to provide power for starting and operation. The engine shown is of a four stroke cycle type having five cylinders.

Engine block 50 comprises five similar cylinder assemblies designated 51A, 52A, 53A, 54A, and 55A each having an injector such as 61 for injecting a first and a second reactant in a contacting and mixing relation, an intake valve such as 62, an exhaust valve such as 63, a piston such as 64, a connecting rod such as 65, and a crank bearing such as 66. The crank bearings 66 connect to a crank shaft 67. The crank shaft is linked by conventional means, not shown, to a cam assembly, also not shown, which opens and closes the intake valves and the exhaust valves at appropriate phases. A first reactant reservoir 70 provides the first reactant, such as NaK, under pressure to first reactant valves such as 71. A second reactant reservoir 72 provides the second reactant, such as water, under pressure to second reactant valves such as 73. For each cylinder, the first and second reactant valves are controlled to operate together by a solenoid such as 74 thereby forming jets at substantially the same time. During normal operation after the engine has started, a working fluid such as air from working fluid intake 75 flows past an open intake valve into a cylinder in an intake phase, shown as 52A, and is compressed in a cylinder in a compression phase, shown as 54 A. The first and the second reactant valves 71 and 73 are opened together by solenoid 74 for injection of the first and the second reactant into a cylinder combustion chamber such as 76 to coincide with maximum compression of the working fluid. Reaction heat and evolved gases added to the working fluid force the piston to turn the crank against load 77. During an exhaust phase, shown as 53A, the working fluid now including products of reaction of the first and the second reactants and of the evolved gases is forced past an open exhaust valve into exhaust system 78. The exhaust system removes particulate reaction products from the gaseous portion of the working fluid which is released to the atmosphere as is described in more detail in copending application Ser. No. 779,788.

Starting of a stationary engine is attained by selecting injection of the first and second reactants into a cylinder in an expansion phase. In reciprocating engines, the crank angle must be sufficient to result in a substantial component of force normal to the crank radius to generate a torque on the crank. A piston at top or bottom center, for example, would not generate such a torque. Crank angles and phases shown in the drawing are: cylinder 51A is at 0° at top center just entering an expansion phase, cylinder 55A is at 72° in an expansion phase, cylinder 52A is at 144° in an intake phase, cylinder 54A is at 216° in a compression phase, and cylinder 53A is at 288° in an exhaust phase. Selection of a cylinder for injection of the first and second reactants is determined by controller 80 in response to crank angle information from distributor 81, to engine rotation speed information from tachometer 82, and to driver demand information from accelerator 83. The distributor has a rotor 84 which is connected to the crank through gear reducer 85 which gear reducer provides a 2:1 division for four stroke cycle engines which have one power stroke for every two revolutions of the crank. Alignment of the rotor 85 with sensors 51B through 55B generates a signal for the controller indicating the beginning of an expansion stroke in corresponding cylinders 51A through 55A. When the accelerator input corresponds to driver demand for start and operate, when the rotor and crank positions are as shown in the drawing, and when the tachometer input corresponds to zero RPM, the controller rejects injection of reactants into cylinder 51A entering an expansion phase since starting torque is not generated and instead causes injection of the first and second reactants into cylinder 55A which is substantially into an expansion phase and has a substantial component of force normal to a crank radius. Evolved hot gases drive the piston downward to begin crank rotation. As the controller senses further entry of cylinder 51A into an expansion phase, it causes injection of the first and second reactants into cylinder 51A to contribute to starting power. As the crank continues to rotate, a partial charge of working fluid initially present in cylinder 54A is compressed and the first and second reactants are injected at top center with evolution of hot gases which react with the working fluid as, for example, evolved hydrogen reacting with atmospheric oxygen. Further rotation of the crank compresses a full charge of working fluid in cylinder 52A for injection of the first and second reactants at maximum compression with complete combustion of the evolved gases with the oxidizing component of the working fluid to enter normal operation. The controller functions just described are readily attained by known microprocessor methods. The injectors for the first and second reactants preferably are of the common rail type and may include mechanical actuating assemblies responding to the controller to provide the functions just described. Unlike fuel injectors for Diesel engines, the present injectors inject reactants as streams or jets rather than as sprays forming droplets of critical size thereby reducing pumping pressure and allowing less critical orifice design. The first and second reactant streams react violently to increase surface and to disperse the reactants in the combustion chamber. It was shown in the cited paper by Kilpatrick et al. that mixing as well as contacting of such streams occurred within a two millisecond injection period for a complete reaction in the case of NaK and water as the first and second reactants.

Materials for engine surfaces exposed to reaction products of the preferred reactants NaK with water in the presence of air are preferably cladings of nickel and its alloys. The basic reaction of nickel with alkali hydroxides is represented by $$KOH + Ni \rightarrow NiO + \tfrac{1}{2}H_2 + K$$

and begins at about 600° C. in a vacuum. At atmospheric pressure, the reaction occurs at white heat on nickel filings at reasonable rates for reduction of KOH. At about 500° C., substantially pure fused NaOH corrodes nickel at a rate of about 0.005 inch per year. Hydrocarbons retard corrosion to the extent that iron surfaces can be used. As an example, kerosene provides a protective film which inhibits corrosion of cast iron pots used to dehydrate NaOH at 220° C. Diesel fuels occasionally use dispersed metallic sodium at low concentrations of up to 0.5% to increase cetane number for improved ignition, as disclosed in U.S. Pat. No. 2,625,345, without apparent harm.

An automobile, having an average life of 10 years and 100,000 miles, has a typical engine operating time of $\tfrac{1}{3}$ year. The following types of surface are exposed to NaK hydroxide. Exhaust system characterized by moderately high temperatures at substantially atmospheric pressure. Combustion chamber surfaces not subject to wear characterized by transient high temperatures at high pressures. Combustion chamber surfaces subject to wear characterized by presence of a lubricant hydrocarbon film and progressive exposure to high but decreasing temperature and pressure. In the combustion chamber, NaK hydroxide forms at vaporizing temperatures but condenses into a liquid phase during an expansion phase and remains liquid into the exhaust system. Excess water as vapor and atmospheric oxygen are present as are some salts of acidic oxides of nitrogen which salts tend to inhibit corrosion. Based on known corrosion rates of nickel in alkali hydroxides, corrosion under the engine conditions is expected to be less than 0.005 inch over an engine's operating life. The nickel surfaces may be applied on iron substrates by such known means as electroforming.

All reactants upon which the internal combustion engines of this invention are based react spontaneously and instantly upon contact as is characteristic of negligible activation energy. Such reactants may or may not evolve gases and, if gases are evolved, they may or may not react subsequently to release additional heat as illustrated by the following examples. Sodium and bromine react instantly upon contact to form sodium bromide. Since no gas is evolved, these reactants could not be applied to the starting process described previously although normal operation after conventional cranking with injection of the sodium and bromine into a working fluid at maximum compression would include heat release for restrained expansion to develop power. The preferred reaction of NaK with water evolves hydrogen for the starting process of the invention and for subsequent reaction with oxygen after compression occurs. Inert working fluids, such as steam or additional hydrogen, would not result in such subsequent reaction. Another reaction of negligible activation energy which evolves combustible gases is water with triethyldialane, $(C_2H_5)_3Al_2H_3$, to evolve ethane and hydrogen.

Comparing the present reactant contact ignited engines to conventional spark and compression temperature ignited engines, the following advantages are apparent.

a. Compared to the spark ignited engine, the reactant contact ignited engine shares with the compression temperature ignited engine the advantages of higher compression ratio for improved efficiency, operation with lean mixtures for improved combustion efficiency, and control of engine power by quantity of injected fuel rather than by throttling for reduced pumping losses and improved efficiency.

b. Compared to both spark and compression temperature ignited engines, the present engine has the advantages of eliminating or substantially reducing detonation be releasing a significant portion of reaction heat without ignition delay and thus without detonation, and by releasing remaining reaction heat under conditions which assure rapid combustion with reduced accumulation of intermediate active species which tend to detonate.

c. Also compared to both spark and compression temperature ignited engines, the present engine has the advantage of assured starting using hot gases evolving from the reactants to provide cranking power. Cold engine starting occurs upon injection of the reactants without auxiliary ignition by spark or glow plugs. The engine may be programmed to turn off during coasting and idling for improved fuel economy with reliable and smooth restart on driver demand.

Assured starting and substantially reduced detonation under a broad range of engine conditions characteristic of reactants having negligible activation energy of reaction used in the present engine obviate undesirable compromises required in conventional engines which limit fuel economy and preclude simple engine design. One improvement is use of an optimal compression ratio to avoid excess heat and friction losses which result from the high compression needed for starting automotive Diesel engines and also to avoid thermodynamic inefficiencies which result from the low compression needed to reduce detonation in Otto engines. Another improvement is use of economical open chamber structures for automotive engines with direct fuel injection due to reduced detonation rather than use of the more complex divided chamber structures. The open chamber with reduced detonation also allows rapid injection with heat release at substantially maximum compression for improved thermodynamic efficiency rather than the extended combustion time of pre-chamber mixtures. Yet another improvement is use of more simple apparatus to provide more efficiently reacting mixtures of reactants since mixture adjustments for varying engine temperatures are not required to control ignition and since most reaction products can be retained in the vehicle as non-gaseous phases thereby obviating various inefficient and complex means for limiting harmful gaseous emissions.

The preceeding description illustrating the invention by piston engines is representative of internal combustion engines generally including intermittent rotary and turbine types. The reactants generally heat a working fluid which expands against a movable member restrained by a load to develop power. The reactants react with negligible activation energy to release heat and to add products of their reaction to the working fluid. When the products of reaction include gases, the evolved gases expand against the movable member to overcome engine ineria as the load to provide power for starting.

What I claim is:

1. In an engine having an internal combustion chamber and power generating displaceable engine means in said combustion chamber, the improvement comprising:
   - a source of reactants having negligible activation energy, joining said source of reactants to said internal combustion chamber,
   - means for introducing a working fluid into said internal combustion chamber whereby heat of an explosive reaction of said reactants directly operates said power generating displaceable engine means, and
   - a collector outside said internal combustion chamber to collect and store particulate by-products of combustion.

2. The engine of claim 1 wherein said working fluid is compressed air.

3. The engine of claim 1 wherein said reactants comprise a liquid alkali metal and water.

4. A method for operating an internal combustion engine comprising the steps of:
   - compressing a working fluid in a combustion chamber which communicates with a movable member of the internal combustion engine,
   - injecting reactants having negligible activation energy in a contacting relationship into the compressed working fluid in the combustion chamber whereby the reactants release heat spontaneously upon their contact, and
   - connecting a load to the movable member to develop work from the heat released by the reactants as the working fluid expands against the movable member.

5. The method of claim 4 wherein the reactants having negligible activation energy are liquids and the step of injecting said reactants in a contacting relationship comprises:
connecting one of the reactants to one injector and connecting another of the reactants to another injector,
operating the injectors at substantially the same time so that a reactant jet issues from each of the injectors, and
aligning the injectors so that the jets collide.

6. In an internal combustion engine having a combustion chamber communicating with a movable member coupled to a load and means for admitting a working fluid into the combustion chamber for compression by the movable member, the improvement comprising:
reactants having negligible activation energy whereby said reactants react instantly and spontaneously upon contact to release heat, and
means for injecting said reactants in a contacting relationship into the working fluid at substantially maximum compression whereby said heat contributes to restrained expansion of the movable member.

7. The internal combustion engine of claim 6 wherein the means for injecting said reactants in a contacting relationship comprises:
a first injector which communicates with one of the reactants and a second injector which communicates with another of the reactants, said injectors having means for forming jets of the reactants communicating therewith,
means for operating the injectors at substantially the same time to form simulataneously issuing jets, and
means for maintaining alignment of the injectors so that the jets collide.

8. A method for operating an internal combustion engine, comprising the steps of:
compressing a working fluid in a combustion chamber which communicates with a movable member of the internal combustion engine,
injecting an alkali metal and water in a contacting relationship into the compressed working fluid in the combustion chamber whereby the alkali metal and water reactants release heat spontaneously upon their contact, and
connecting a load to the movable member to develop work from the heat released by the reactants as the working fluid expands against the movable member.

9. The method of claim 8 wherein the working fluid is air.

10. The method of claim 8 comprising the further step of collecting and storing particulate by-products of the alkali metal and water reactants.

11. In an internal combustion engine having a combustion chamber communicating with a movable member coupled to a load and means for admitting a working fluid into the combustion chamber for compression by the movable member, the improvement comprising:
alkali metal and water reactants, said reactants reacting instantly and spontaneously upon contact to release heat, and
means for injecting said reactants in a contacting relationship into the working fluid at substantially maximum compression whereby said released heat causes restrained expansion of the movable member.

12. The internal combustion engine of claim 11 wherein the working fluid is air.

* * * * *